United States Patent [19]

Roberts

[11] 4,077,833

[45] Mar. 7, 1978

[54] FIRE RESISTANT, BAUXITE-CONTAINING, WOOD COMPOSITION BOARD

[75] Inventor: James R. Roberts, Palatine, Ill.

[73] Assignee: Eucatex S.A. Industria E Comercio, Sao Paulo, Brazil

[21] Appl. No.: 630,615

[22] Filed: Nov. 10, 1975

Related U.S. Application Data

[63] Continuation-in-part of Ser. No. 597,451, Jul. 21, 1975, Pat. No. 4,043,862, and Ser. No. 597,450, Jul. 21, 1975.

[51] Int. Cl.$^2$ .......................... D21H 3/22; D21H 3/28; D21H 3/66
[52] U.S. Cl. .................. 162/176; 162/181 B; 162/181 C; 162/181 D; 162/187
[58] Field of Search ............... 162/145, 149, 159, 176, 162/181 R, 181 B, 181 C, 181 D, 187; 428/920

[56] References Cited

U.S. PATENT DOCUMENTS

| 570,361 | 10/1896 | Archbold | 162/181 B X |
|---|---|---|---|
| 1,907,711 | 5/1933 | Becher | 162/159 |
| 2,108,761 | 2/1938 | Becher | 162/145 |
| 3,379,609 | 4/1968 | Roberts et al. | 162/181 R X |
| 3,682,667 | 8/1972 | Roberts et al. | 162/145 X |

*Primary Examiner*—Richard V. Fisher
*Attorney, Agent, or Firm*—Eugene D. Farley

[57] ABSTRACT

A fire resistant bauxite composition board comprises, in percent by weight, from 10 to 85% lignocellulose particles, from 65 to 20% bauxite particles, and from 5 to 25% binder, particularly a hydrated cellulosic gel binder. The bauxite, (aluminum oxide dihydrate), is characterized by containing a large amount of water of hydration, by stability below 200° C., and by release of its water of hydration at above 200° C. Accordingly, the bauxite-containing board is stable during its manufacture, storage and use. However, in a fire situation the substantial amount of released water of hydration materially supplements the inherent non-combustible character of the bauxite in increasing the fire resistance of the board.

15 Claims, No Drawings

FIRE RESISTANT, BAUXITE-CONTAINING, WOOD COMPOSITION BOARD

BACKGROUND OF THE INVENTION

This is a continuation-in-part of my copending patent applications, Ser. No. 597,451, filed July 21, 1975 entitled Fire Resistant Vermiculite Composition Board, now U.S. Pat. No. 4,043,862, and Ser. No. 597,450, filed July 21, 1975 entitled Medium Density, High Strength Lignocellulose Composition Board Including Exhaustively Hydrated Cellulosic Gel Binder.

This invention relates to fire resistant composition board. It pertains particularly to fire resistant lignocellulosic composition board containing bauxite as a primary constituent.

In a widely practiced commercial process for making composition board, a fibrous cellulosic pulp slurry is run onto a Fourdrinier wire screen and vacuum formed into a wet sheet. The sheet is roller pressed to the desired thickness and kiln dried.

Fire resistant composition board is made similarly, employing a substantial proportion of a mineral substance in the slurry. Mineral substances thus employed include gypsum, perlite, mineral fiber, fiberglass and vermiculite.

In the past it also has been proposed to use aluminum hydrate (aluminum hydroxide) and bauxite (hydrated aluminum oxide) as the mineral substance in such boards. Representative of composition board including these materials are the boards disclosed in U.S. Pat. Nos. 570,361; 1,907,711; and 2,108,761.

However, the prior investigators have utilized the aluminum hydrate or hydrated aluminum oxide solely because of its incombustible character. The peculiar value has not been recognized of employing as a fire resistant component of lignocellulosic composition board particles of bauxite (hydrated aluminum oxide) characterized by a physical condition and chemical composition such that, although stable under normal conditions of manufacture, storage and use, when exposed to a fire environment they liberate water vapor in amount sufficient to be a significant and often determining factor in reducing the combustible character of the board in which they are contained, thereby increasing its resistance to fire.

The term "bauxite" as used herein designates aluminum oxide dihydrate of the following formula:

$$Al_2O_3 \cdot 2H_2O$$

Bauxite has a theoretical water of hydration content of 26% by weight. It is characterized further by being stable at temperatures below about 200° C., i.e., at the temperatures prevailing during the manufacture, storage and use of the composition boards in which it is contained. However, when exposed to fire conditions, it is characterized by the substantially total release of its water of hydration, such water being converted to the form of water vapor when the bauxite is heated to temperatures above about 200° C.

This water vapor being a non-combustible gas retards the combustion of the composition board. Also, the absorption of heat from the fire by conversion of the water of hydration to vapor form further retards the combustion of the composition board. As a consequence, composition boards containing bauxite have significant and unique properties of fire resistance which render them valuable as articles of commerce.

It accordingly is the general purpose of the present invention to provide a fire resistant composition board, specifically a bauxite-containing, fire-resistant composition board, which has a high degree of fire resistance, which is manufactured readily by conventional processes, which utilizes a low cost, readily available fire resistant ingredient (bauxite) and accordingly can be manufactured economically, which has the fire resistant qualities adequate to pass the various tests and standards required of fire resistant composition boards, which is of attractive appearance, which has good surface qualities and adequate qualities of machining and working, and which is not so excessively heavy that its transportation and application become a problem.

BRIEF STATEMENT OF THE INVENTION

The hereindescribed fire resistant bauxite composition board comprises a felted dried sheet comprising in dispersed admixture lignocellulose particles, bauxite particles, and a binder for the bauxite and lignocellulose particles.

To be suitable for application, the bauxite component of the board should contain substantially its normal content of chemically bound water of hydration. It also should be characterized by substantial stability at temperatures below about 200° C., and by the almost total conversion of its water of hydration to the form of released water vapor at temperatures above about 200° C.

Of particular value as a binder component of the presently described bauxite composition board is cellulosic gel hydrated to a condition at which it has a TAPPI drain time of at least 350 seconds. As supplemental constituents of the composition board there may be included from 10 to 50% by weight vermiculite particles for the purpose of weight reduction and added fire resistance; and from 5% to 20% ceramic clay, which increases the stability of the board when it is subjected to fire.

DESCRIPTION OF SPECIFIC EMBODIMENTS OF THE INVENTION

The fire resistant bauxite composition board of the invention has the following general composition and is illustrated by the following specific formulations wherein parts are given in percent by weight, air dried basis:

|  | General Composition (%) | Preferred Composition (%) | Specific Formulations (%) | |
|---|---|---|---|---|
| Lignocellulose particles | 10 to 85 | 20 to 65 | 35 | 19 |
| Bauxite particles | 65 to 20% | 65 to 20 | 50 | 25 |
| Binder | 5 to 25 | 5 to 25 |  |  |
| Hydrated Gel Binder |  |  | 12 | 12 |
| Starch Binder |  |  | 3 | 3 |
| Vermiculite |  |  |  | 35 |
| Clay |  |  |  | 6 |

The lignocellulose particles which are a primary structural component of the hereindescribed medium density composition boards may be derived from a wide variety of sources. Representative sources include bagasse and such woods as the wood of the eucalyptus, cottonwood, willow, alder, Douglas fir and pine.

Where woody materials are employed they may be used in the form of chips, planer shavings, flakes or sawdust. Whatever their source, the materials first are size reduced, preferably by being defibrated to the form of lignocellulosic fibers and fiber bundles. This is accomplished in suitable apparatus, such as Bauer or Sprout-Waldron mechanical refiners. A preferred defibrating system includes the conventional Asplund defibrator wherein wood pieces are subjected to abrasive reduction in an environment of steam under pressure of from 40 to 150 pounds per square inch. If desirable or necessary, the fibrous product of the Asplund machine may be passed to a secondary refiner such as an Asplund raffinator for ultimate reduction to a particle size of 10% maximum plus 12 mesh, U.S. Sieve Series. The TAPPI-CSF freeness of the resulting fibrous product preferably is less than 750.

The second primary constituent of the hereindescribed fire resistant composition boards comprises, as noted above, bauxite (aluminum oxide dihydrate).

This mineral is distributed abundantly in various geographical locations and is readily available commercially as an article of commerce. It is available in a hydrated form in which it contains at least about 26% by weight water of hydration. It is characterized by stability at temperatures below 200° C., and also by the ability to release its water of hydration in the form of water vapor upon being heated to temperatures above 200° C. A typical sample starts to release its water of hydration at a temperature of about 250° C. and releases all of its water of hydration at a temperature of about 450° C. A substantial amount of heat is required for this conversion, and it is this factor which is responsible for the increased fire resistance of composition boards containing bauxite.

This behavior of bauxite (aluminum oxide dihydrate) is to be distinguished from that of gypsum, (calcium sulfate dihydrate), the primary constituent of gypsum board. Like bauxite, gypsum loses its water of hydration upon being heated. However, gypsum releases its water of hydration at a temperature of 49° C. as opposed to above 200° C. for bauxite. This leads to two serious disadvantages.

Unless special precautions are taken, the gypsum content of gypsum board will lose its water hydration in the dry kiln during manufacture of the board. Accordingly, the board has to be dried very slowly, thereby slowing down the production rate and curtailing the production of the mill. Bauxite board, on the other hand, can be dried rapidly at high temperature, increasing the production rate and plant capacity correspondingly.

In use, the gypsum content of gypsum board will lose its water of hydration when exposed to high temperature environments such as boiler rooms and other areas where temperatures are very high, with resultant failure of the board. Composition boards containing bauxite are not subject to this disadvantage.

To be suitable for use in the presently described composition board, the bauxite should be in a condition in which it is compatible with the other constituents of the board making furnish. It also should be in a form in which it will release its water of hydration rapidly and effectively when exposed to a fire condition. This is achieved by the provision of a bauxite product having a particle size of from −325 to −12 mesh, preferably −12 to −200 mesh, U.S. Sieve Series. Screen analysis of a typical bauxite product suitable for the present purpose shows 0.6% on 35 mesh, 18.62% on 120 mesh, and 80.72% through 120 mesh.

Also, as incorporated in the board-making furnish, the bauxite component should contain at least 20% by weight of chemically bound water of hydration. Considering that 100% pure bauxite contains theoretically 26% water of hydration, this lower value of 20% takes into account the use of an impure bauxite, or one that is incompletely hydrated. In practice, commercial bauxite may contain from 28 to 32% water, presumably because of the presence of a supplemental quantity of occluded moisture, or of highly hydrated mineral impurities other than bauxite.

A bauxite product eminently suited for the present purpose, is available commercially at very low cost as waste screenings derived from the processing of bauxite mineral to be used in the manufacture of aluminum oxide.

The binder for the lignocellulose and bauxite particles employed in the manufacture of the hereindescribed fire resistant composition boards broadly comprises a highly hydrated cellulosic gel, starch, or a mixture of these two binder materials. The highly hydrated cellulosic gel is of particular interest since it is uniquely suited for application in fire resistant board containing a major proportion of bauxite.

The gel is a superior binder for the bauxite and lignocellulose particles. In the manufacture of the board, the gel serves a primary function in retaining the bauxite particles in the boardforming slurry so that they are not lost in the drainings from the forming screen. The gel helps disperse the bauxite particles throughout the board-making furnish, and to maintain them in a uniform dispersion. The gel is not affected adversely by the conditions prevailing in the kiln during drying of the board products.

Also, the gel has an extremely small particle size and coats efficiently and uniformly the fine particles of lignocellulose, bauxite and clay, securely and permanently binding them together in the finished board.

The gem employed distinguishes from the hydrated cellulosic gels of the prior art in that it is exhaustively hydrated to a condition in which it has substantially no fiber structure at all. The difference becomes evident when the gels are subjected to the conventional Schopper-Riegler freeness test, or TAPPI Standard T221-OS-63.

In accordance with TAPPI Standard T221-OS-63, used to measure the freeness of various slow pulps such as are under consideration here, a pulp sample is formed into a sheet 6¼ inches in diameter in a Williams sheet mold. The sheet formed in the mold contains 1.2 grams of dry pulp or gel. The drainage time required to form the sheet is measured and becomes an indication of the degree of hydration of the stock.

In using this test, it readily is possible to distinguish the hereindescribed highly hydrated cellulosic gel binders from the hydrated cellulosic gel products of the prior art, such as those employed in the manufacture of glassines paper, and those employed in the manufacture of prior art composition board products such as are disclosed in Roberts U.S. Pat. No. 3,379,608–9.

I have discovered that it is possible to hydrate cellulosic gel to a degree much more highly advanced than that characteristic of the gels employed in either glassines paper or the composition boards of the aforesaid patents. Thus, the gels employed in my invention have drain times of at least 350 seconds, preferably above 900 seconds, and in particular from 900–2000 seconds.

Other test methods may be employed to identify and characterize the hereindescribed exhaustively hydrated cellulosic gel binders.

One such is to determine the shrinkage upon drying of the hand sheet produced by the above described TAPPI test. A suitably hydrated gel will form a hand sheet which shrinks upon drying to a diameter which is at least 35% smaller than its original diameter.

In a third method, the hand sheet is dried and a small flame applied to its underside. If the cellulose is sufficiently hydrated, the flame instantaneously will produce a blister on the sheet.

In a fourth test method, 250 ml. of the refined pulp slurry is dried into a solid ball. If the gel is sufficiently hydrated for the present purposes, the ball will sink when dropped into water and thereafter will remain hard without swelling for an indefinite period of submergence.

The use of the thus characterized exhaustively hydrated cellulosic gel binders in the medium density composition boards of my invention is critically significant for several reasons.

In the first place, the gel serves for a highly efficient binder which binds the lignocellulose fibers together in an integrated product. Upon drying, the gel binder shrinks materially, pulling the particles together and locking them irreversibly in their consolidated condition. This factor is of primary importance in determining the increased strength of the board product.

The gel also serves as a binder, which acts very rapidly to set the thickness and density of the felted sheet when it is introduced into the press. This makes possible a quick pressing operation, i.e., one requiring a press time of only 10 seconds to three minutes, preferably from 10 seconds to 60 seconds. This in turn produces significant economies in requiring only a relatively expensive single opening press, which easily is adaptable to inclusion in conventional plant production lines.

Several other important advantages stem from the use of the novel cellulosic gel binder described above. The binder imparts water resistance to the board product in which it is contained. As noted, such products contain from 5 to 40% by weight of the binder and the binder is so highly hydrated as to be substantially insoluble in water. This imparts a high degree of binder water resistance to the board product. The gel binder is superior in this respect to conventional fiber board binders such as the urea formaldehyde thermosetting resins.

Still further, the gel is a highly efficient dispersion aid in the formation of the fiber slurries from which the boards are made. In this application, it disperses into individual fibers wood fiber clumps which may be contained in the slurry. It also thickens the slurry so that as it is run on the wire at a consistency of about 5% there is little tendency for any light particles contained in the slurry to float, or any heavy particles to sink. Still further, it is responsible for the formation of a very stable slurry which is converted to a finished board product of completely homogeneous cross section.

Fourth, the gel serves as a fines retention agent. This is of particular importance during vacuum forming of the board from a pulp slurry run onto the screen. During this procedure, finely divided particles present in the slurry tend to be extracted from the formed sheet by the run-off water. As a retention aid, the gel serves the valuable function of retaining these fines within the sheet, thereby conserving raw materials, improving the properties of the board, and minimizing a waste disposal problem.

The hydrated cellulosic gels suitable for the intended purpose are products in which water of hydration is added to cellulose molecules by the substantially complete beating or refining of cellulose in aqueous medium. The cellulose thereby is converted from a fluffy, fibrous condition into a gelatinous condition, the degree of conversion being dependent upon such variables as the duration of the refining, the nature of the refining equipment, the presence or absence of extraneous chemicals, etc. Conventionally, the conversion is effectuated by mechanically treating cellulose pulp in aqueous medium in disc type refiners equipped with lava tackle or in conical refiners such as the Jordan.

The cellulose pulp for the gel manufacture may be derived from any one of several sources, such as the bleached or unbleached wood or bagasse pulps manufactured by the conventional sulphate or sulphite papermaking processes. If bagasse is employed as the ultimate raw material, it preferably is depithed before being pulped. The pulps are available on the large commercial scale in the form of dried pulp sheets.

In the manufacture of the hereindescribed gel products, the cellulose pulp is refined and hydrated exhaustively to a high degree at which fiber structure is almost completely destroyed. This is accomplished by breaking down the cellulose pulp sheets to their component individual fibers or fiber clumps, preferably by adding the dry sheets and water to a conventional hydrapulper, and hydrapulping at a stock consistency of from 1 to 10%, preferably from 6 to 8%. This requires about 30 minutes.

The resulting pulp then is pumped to a storage tank and fed in controlled flow to the selected disc type or conical type primary refiner. There preferably are three such refiners arranged in series with a flow restricting valve downstream from the last refiner to insure an adequate refiner dwell time. These abrade the pulp and hydrate it to a high degree.

The resulting partially refined and hydrated pulp is passed into a second storage tank which supplies a secondary refiner of the same general class as the primary refiner, but which is effective to complete the hydration and size reduction of the pulp to values imparting to the pulp TAPPI standard drain times of at least 350 seconds, preferably above 900 seconds. This is accomplished by a shearing action which almost completely destroys the fiber structure of the pulp, works the water into the cellulose molecules, and hydrates the pulp exhaustively. This supplemental and exhaustive refining greatly improves the qualities of the pulp as a binder, dispersing agent, and retention agent when used in the manufacture of the hereindescribed fire resistant composition boards.

In particular, it makes of the gel an "irreversible" binder. This means that a composition board made with the hereindescribed highly refined gel binder can be subjected to the action of boiling water for several hours, with little softening or relaxing of the adhesive bond present between the bonded fibers. If the board is dried after having been subjected to such a boil test, it is just as strong as it was before boiling. This is the same characteristic exhibited by phenolic resins when they are used as binders. It no doubt is responsible for the improved water resistance of the composition boards of my invention.

To supplement the binding action of the hydrated cellulosic gel binder, or to replace it entirely in some instances, there may be included in the board products of the invention from 1 to 20% by weight, dry solids basis, of a starch type binder, the starch comprising either corn starch or tapioca starch. Tapioca starch is preferred. Because of its low gel point of 165° F., the tapioca starch when used uncooked does not slow drainage of the furnish on the wire.

The starch is incorporated into the furnish in the form of an uncooked, commercially available, dry powder. It develops its adhesive qualities as it is cooked upon passing the wet-formed mat through the kiln.

A usage of tapioca starch or corn starch in an amount of from 1 to 3% by weight has the advantage of providing a board of slightly increased hardness. A starch usage of greater than 3% has the advantage of reducing materially the drying rate of the board in the kiln. An appreciable proportion of the water content of the wet board is bound chemically by the starch as it cooks.

In addition to the above noted primary constituents of the hereindescribed fire resistant composition board, i.e., the lignocellulose particles, the bauxite particles, and the binder, certain supplemental materials may be added to advantage.

One such is heat-expanded vermiculite particles added in an amount of from 10 to 50% by weight, air dried board basis. The expanded vermiculite is a comparatively bulky material and serves the function of reducing the weight of the board while at the same time maintaining its high degree of fire resistance.

The vermiculite may be added in the form and in the manner outlined in my co-pending U.S. Patent Application Ser. No. 597,451, now U.S. Pat. No. 4,043,862 referred to above, of which the present application is a continuation-in-part.

Another supplemental material which may be added to advantage is a suitable clay, in particular those clays known to the trade as ceramic clays. These have the common property of sintering when exposed to elevated temperatures. To be suitable, their sintering temperatures should be below the temperature developed by combustion of wood or other organic materials, preferably below about 2,000° F. Their particle size should not be over 50 mesh, U.S. Sieve Series.

The clays suitable for use in the composition boards of the invention comprise broadly the hydrous silicates of alumina of widespread occurrence. One such which is commercially available comprises a hydrous silicate of alumina containing 57% silica, 27.9% alumina and 9.8% combined water. Another suitable clay product comprises the commercially available hydrous silicate of alumina containing 63% silica, 26% alumina and 8.4% combined water.

These and other clays are used in the composition boards of the invention in finely divided form and in the amount of from 5 to 20% by weight, dry board basis.

Still other supplemental materials which may be added include sizing materials e.g. 0.5 to 3% by weight conventional wax sizes such as Petrolatum or Hercules Paracol wax to improve the water resistance of the boards; other fire retardants such as borax, boric acid and ammonium phosphate; supplemental fibers such as sisal or fiberglass used in amount of from 5 to 15% to increase board toughness and impact resistance; pigments; and in some cases supplemental phenolic resin binders used in amount appropriate to the development of desired properties.

In the manufacture of the fire resistant bauxite composition board of the invention the board making furnish is prepared by first placing the total amount of water predetermined to achieve a desired furnish consistency of 6 to 8% in a tank equipped with agitating means. Next the hydrated cellulosic gel is added, after which are added the starch binder, if used, clay, if used, and the lignocellulosic particles. The predetermined amount of bauxite is added last, after the other constituents have been thoroughly mixed and dispersed with each other.

The furnish thus prepared then is run immediately onto the forming wire of a Fourdrinier or other conventional board making apparatus equipped with pressure rolls for rolling the wet lap to the predetermined thickness.

The sheet is vacuum formed and roll pressed to a solids content of about 30% by weight, after which it is cut into sheets and transferred to a three zone kiln.

In the first zone of the kiln, temperatures of 600° to 700° F. are maintained in order to cook the starch content of the mat and develop its adhesive qualities. In the second and third zones, where much drying of the mat occurs, the temperatures are regulated at between 450° to 550°, and 400° to 500° F. respectively.

Drying is continued to a final board moisture content of less than 1%, preferably about 1/2% by weight. This is of importance since if a small excess of water is present, for example that represented by a board moisture content of 3% by weight, that moisture is concentrated in the center of the board as a "wet line". This means that the moisture content along the neutral axis of the board may be as high as 15 to 20%. In such a case, the boards discharged from the kiln are weak and may be damaged very easily in subsequent handling operations, as when moving the sheets by hand, or subjecting them to the stripping action of a punch press such as is employed to punch small holes into the board surface in the manufacture of acoustical board.

After forming and drying, the boards are cooled, trimmed, finished as needed for the contemplated product and packaged for shipping.

As a result of the foregoing there are produced uniform boards having moisture contents of less than 1% and any desired density. For example, there may be produced in this manner insulation boards having a density of from 14 to 18 pounds per cubic foot. By the methods conventionally used for such products, there also may be produced medium density boards having densities of from 40 to 45 pounds per cubic foot, and true hard boards having densities of from 55 to 75 pounds per cubic foot.

The hereindescribed bauxite-containing fire resistant composition boards are illustrated in the following examples, wherein parts are given in percent by weight, dry board basis.

EXAMPLE 1

To demonstrate the efficiency of bauxite as a fire resistant component of wood composition boards, there was made a series of such boards ranging in density between 16 and 55 pounds per cubic foot and characteristic of insulation board, medium density board and true hard board. As a control, one of the boards, which corresponds to commercial insulation board, contained no bauxite.

The lignocellulose component of each of the boards comprised eucalyptus wood defibrated in an Asplund defibrator at a steam pressure of 150 pounds per square inch to a fiber size of 20% of +12 mesh mix followed by refining in an Asplund Raffinator. In the case of the control board a proportion of ground wood was included as a binder.

The bauxite component of the boards comprised mineral bauxite screenings analyzing 0.6% on 35 mesh, 18.62% on 120 mesh, and 80.72% through 120 mesh. It contained from 28 to 32% by weight chemically bound water of hydration. Tests indicated that upon heating the bauxite it started to lose its water of hydration at 250° C. and lost it completely at 450° C.

In each case the board-making furnish was prepared by first placing the total amount of water predetermined to achieve a furnish consistency of from 4 to 5% in a tank equipped with an agitator. Next the hydrated cellulosic gel binder and starch binder were added in that order. The predetermined amount of bauxite was added last after the other constituents were thoroughly mixed and dispersed in each other. This prevented the bauxite from settling out in the mixer.

The furnish thus prepared was run at once onto the forming wire of a Fourdrinier machine where it was formed into a wet lap which was roll pressed to the desired thickness, cut into sheets and kiln dried. In the case of the medium and high density boards, the sheets were pressed wet to the indicated density.

The board samples thus prepared then were subjected to ASTM Standard Test SSA-118-b for measuring flame spread on construction type board products. The test consists basically of exposing board samples to an alcohol flame for two minutes, and noting the area of char, measured in square centimeters. A char area of less than 80 square centimeters indicates a class A board for fire resistance. The results for the six board samples tested are recorded in the table below, wherein the composition values are given in percent by weight.

| Board Number | 1 | 2 | 3 | 4 | 5 | 6 |
|---|---|---|---|---|---|---|
| Defiberized Wood | 82 | 33 | 35 | 28 | 23 | 48 |
| Ground Wood | 15 | | | | | |
| Bauxite | | 50 | 50 | 50 | 50 | 30 |
| Cellulosic Gel* | | 15 | | 20 | 25 | 20 |
| Tapioca Starch | 2 | | 13 | | | |
| Paracol Wax Emulsion | 1 | 2 | 2 | 2 | 2 | 2 |
| Density, lbs/cu. ft. | 16 | 18 | 31.2 | 31 | 55 | 30 |
| Thickness - inches | 0.5 | 0.5 | 0.5 | 0.5 | 0.5 | 0.5 |
| Modulus of Rupture lbs/sq. in. | 240 | 385 | 650 | 1048 | 3415 | 1820 |
| Flame Char Area sq. cm. | 280 | 61.4 | 73.2 | 42.3 | 28.2 | 75.4 |

*TAPPI drain time 800 seconds.

Inspection of the foregoing results indicates that all of the boards of the invention i.e., boards 2 through 6, obtained a class A rating on the flame char test while the control board No. 1 was unsatisfactory in its fire resistance qualities. This corresponds to regular wood fiber insulation board.

Board No. 2 shows a marked increase in fire resistance imparted by the inclusion of 50% bauxite. It is to be noted that this and certain of the other boards tested which contain 50% bauxite contain about 15% of bauxite-derived water of hydration, dry board basis, in a form which is released under fire conditions.

Board No. 3, which substitutes tapioca starch for the cellulosic gel binder demonstrates the unique effect of the latter in retaining the bauxite in the board. As noted, the bauxite is used in very finely divided form which tends to wash out with the drainings from the forming wire. This finely divided material is retained in the sheet by the cellulosic gel and accordingly exerts an increased effect on fire resistance (Board No. 4). Where tapioca starch is substituted for the gel (Board No. 3) a sufficient amount of the bauxite is lost to reduce noticeably the flame resistance qualities of the resulting board, as indicated by an appreciably increased char area.

Board No. 5 contains 50% combustible material in combination with 50% of bauxite. Its fire resistance nevertheless is superior.

In board No. 6, about 70% of combustible materials is present. It nevertheless has a flame char area which borders on that required of a Class A board.

EXAMPLE 2

The procedure of Example 1 was repeated with the exception that a proportion of vermiculite was included in the formulations. This had the effect of lowering the weight of the board materially.

Upon testing the boards in the manner outlined in Example 1, the following results were obtained.

| Board Number | 1 | 2 |
|---|---|---|
| Defiberized Wood | 10 | 19 |
| Bauxite | | 25 |
| Vermiculite | 56 | 35 |
| Cellulosic Gel* | 20* | 12** |
| Tapioca Starch | 4 | 3 |
| Clay | 10 | 6 |
| Density - lbs/cu.ft. | 19 | 21 |
| Thickness - inches | .625 | .625 |
| Modulus of Rupture - lbs/sq.in. | 240 | 355 |
| Flame Char Area - sq. cm. (ASTM test SSA-118-b) | 70 | 49 |
| Fuel Contributed (Underwriters' Lab Test No. R-5551) | 14.7 | 2.6 |

*TAPPI drain time 350 seconds
**TAPPI drain time 1200 seconds

Inspection of the foregoing table indicates that vermiculite per se will produce a board having 34% combustibles which meets Class A fire resistance standards by a narrow margin. Board No. 2 illustrates the effect when 25% of bauxite is added to the board furnish in place of some of the vermiculite, the percentage of combustibles remaining at 34%. Both char area and fuel contributed values are substantially reduced.

Having thus described my invention in preferred embodiments, I claim:

1. Fire resistant, bauxite-containing composition board comprising a felted dried sheet comprising in dispersed admixture:

|  | % by weight, air dried sheet basis |
|---|---|
| Lignocellulose particles | 10 to 85 |
| Bauxite particles | 65 to 20 |
| Binder for bauxite and lignocellulose particles | 5 to 25 | the bauxite being characterized by containing at least 20% by weight of chemically bound water of hydration, by substantial stability at temperatures below 200° C.; but by the release of its water of hydration in the form of water vapor upon being heated to temperatures above about 200° C.

2. The composition board of claim 1 wherein the binder comprises a member of the group consisting of hydrated cellulosic gel, starch, and mixtures thereof, the hydrated cellulosic gel binder in its gel condition being characterized by a TAPPI drain time of at least 350 seconds.

3. The composition board of claim 2 wherein the binder comprises starch.

4. Fire resistant bauxite-containing composition board comprising a felted dried sheet comprising in dispersed admixture:

|  | % by weight, air dried sheet basis |
|---|---|
| Lignocellulose particles | 10 to 85 |
| Bauxite particles | 65 to 20 |
| Hydrated cellulosic gel binder | 5 to 25 | the hydrated cellulosic gel binder in its gel condition being characterized by a TAPPI drain time of at least 350 seconds.

5. The composition board of claim 4 wherein the hydrated cellulosic gel binder has a TAPPI drain time of at least 900 seconds.

6. The composition board of claim 4 wherein the hydrated cellulosic gel binder has a TAPPI drain time of from 900 to 2,000 seconds.

7. The composition board of claim 4 wherein the lignocellulose particles comprise wood particles.

8. The composition board of claim 4 wherein the lignocellulose particles comprise bagasse particles.

9. The composition board of claim 4 wherein the lignocellulose particles comprise wood fiber having a TAPPI-CSF freeness of less than 750.

10. The composition board of claim 4 wherein the bauxite particles have a particle size of from −325 mesh to −12 mesh; U.S. Sieve Series.

11. The composition board of claim 4 including from 10 to 50% by weight vermiculite.

12. The composition board of claim 4 including from 5 to 20% by weight clay.

13. Fire resistant, bauxite-containing composition board comprising a felted dried sheet comprising in dispersed admixture:

|  | % by weight, air dried sheet basis |
|---|---|
| Lignocellulose particles | 20 to 65 |
| Bauxite particles | 65 to 20 |
| Hydrated cellulosic gel binder | 5 to 25 | the lignocellulose particles comprising defiberized wood particles having a TAPPI-CSF freeness of less than 750, the bauxite particles having a particle size of from −12 mesh to −200 mesh, U.S. Sieve Series, and the hydrated cellulosic gel binder having a TAPPI drain time of from 900 to 2,000 seconds.

14. The composition board of claim 13 adapted for use as fire resistant core board and including a supplemental starch binder in the following approximate formulation:

|  | % by weight, air dried sheet basis |
|---|---|
| Defiberized wood fiber | 35 |
| Bauxite particles | 50 |
| Hydrated cellulosic gel | 12 |
| Starch | 3 |

15. The composition board of claim 13 adapted particularly for use as a fire resistant core board for application in wall panel board and doors and including as supplemental components vermiculite, clay and starch, the board constituents being present in substantially the following proportions:

|  | % By weight, air dried sheet basis |
|---|---|
| Defiberized wood fiber | 19 |
| Bauxite particles | 25 |
| Hydrated cellulosic gel | 12 |
| Starch | 3 |
| Expanded vermiculite | 35 |
| Clay | 6 |

* * * * *